United States Patent [19]

Starp

[11] Patent Number: 4,470,679
[45] Date of Patent: Sep. 11, 1984

[54] CENTRAL SHUTTER FOR CAMERAS, ESPECIALLY PROFESSIONAL CAMERAS

[76] Inventor: Franz Starp, Mittlere Steige 36, 7547 Wildbad 5, Fed. Rep. of Germany

[21] Appl. No.: 463,483

[22] Filed: Feb. 3, 1983

[51] Int. Cl.³ .............................................. G03B 9/06
[52] U.S. Cl. .................................... 354/232; 354/274
[58] Field of Search ........................ 354/228, 230–233, 354/272, 14 274

[56] References Cited

U.S. PATENT DOCUMENTS

| 4,339,192 | 7/1982 | Starp et al. ...................... 354/272 X |
| 4,344,688 | 8/1982 | Metabi ................................ 354/272 |
| 4,367,939 | 1/1983 | Okura ................................ 354/272 |

*Primary Examiner*—John Gonzales

[57] ABSTRACT

On professional camera shutters, with an objective comprising a lens system defining an objective light passage, and a polygonal diaphragm, the leaves of which can be actuated by means of a diaphragm actuator control curve cam and in turn be pivoted out of the shutter light passage by means of a steeply ascending cam curve portion, precautions have already been taken to allow adaptation to the given conditions of different shutter objective combinations. These include equipping the diaphragm actuator with an adjusting slide serving to limit the setting range and provided with a scale pointer, and equipping the shutter with a diaphragm scale which is adapted both to the shutter passage size and to the f-number of the objective and which can be attached only when a decision has been made on the combination of the shutter and objective. Since the effect of the steep curve of the diaphragm actuator cam can occur only when the shutter light passage size and the objective light passage correspond to one another, there is assigned to the diaphragm actuator according to the improvement herein a separate curved cam piece which is equipped with an appropriate modifying control curve and which can be advanced to the diaphragm actuator control curve cam such that the diaphragm leaf edges are displaced out of the objective light passage even when the latter is smaller than the shutter passage size.

12 Claims, 5 Drawing Figures

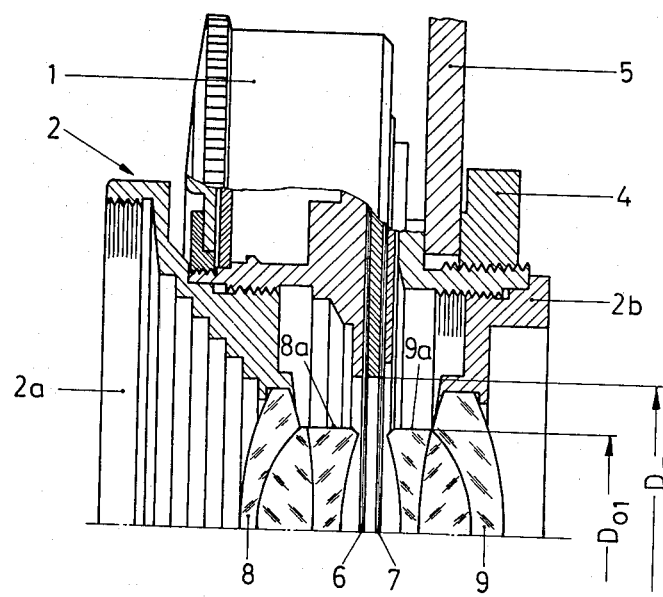
Fig. 1
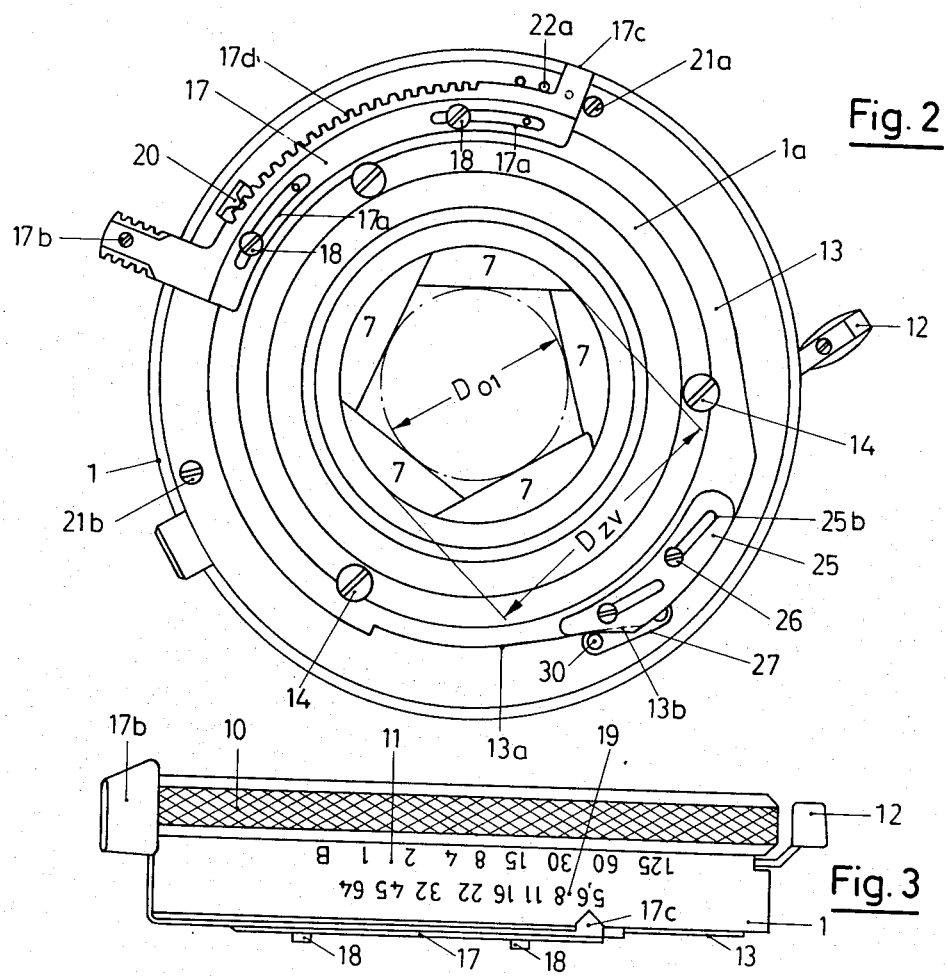
Fig. 2
Fig. 3

CENTRAL SHUTTER FOR CAMERAS, ESPECIALLY PROFESSIONAL CAMERAS

FIELD AND BACKGROUND OF THE INVENTION

The present invention relates to a central shutter for cameras, especially professional cameras.

Such central shutters generally have a built-in objective consisting of a front element and a rear element and also have a polygonal diaphragm which is formed, for example, by five leaves, such leaves comprising an adjustable diaphragm aperture size system, and which can be actuated by a diaphragm actuator on which is formed a control curve cam, comprising a curved cam-portion with a linear characteristic main region and a steeply ascending end region, the latter being provided for pivoting the diaphragm leaves out of or peripherally outwardly beyond the clear passage of the shutter, and on which actuator there is also located, releasably and adjustably, an adjusting slide serving to limit the setting range of the diaphragm. The diaphragm actuator adjusting slide is also provided with a gripping handle and a scale indicator for the purpose of adapting the diaphragm setting mechanism to the specific f-number of the objective which is built into the particular shutter.

To make it possible to adapt the arrangement in the best possible way to given situations when photographs are taken with a professional or studio camera of the type mentioned above, professional photographers usually keep at their disposal several interchangeable objectives of different light intensity equipped with a central shutter, so that each forms a central shutter and diaphragm containing optical lens system objective unit interchangeably insertable in the particular camera being used. In this case, to make it simpler to attach the objectives or units to the camera and to remove them from it, they are each generally fastened on a plate, by means of which the particular objective and the shutter as a unit can be inserted releasably into a snap closure provided on the front carrier of the camera and hence can, as required, be readily exchanged for another such objective/shutter combination or unit.

Because they are equipped with a diaphragm mechanism, objectives or central shutters usable for this category of camera must, of course, also be provided with at least one concordant diaphragm scale which can be attached, as is customary, to the periphery and/or to the front plate of the shutter housing. As always, it is the responsibility or function of the shutter or objective manufacturer to attach the diaphragm scale appropriate for proper concordant use.

In view of the divergence of available shutters with different light passage sizes and objectives having lens systems with optical values differing from one another, this proper attachment of the diaphragm scale can be carried out, in practice, only after the purchase order documents or camera specifications have been submitted, which means that it is possible to equip a shutter with a given diaphragm scale only when a decision has first been made about the relative arrangement of the shutter and the objective to be particularly provided for use therewith. For this purpose, the shutter or objective manufacturer must keep an assortment of diaphragm scales available and from this assortment or inventory need only select the particular scale part suitable for the concordant use with the particular shutter/objective combination and in turn fasten it to the shutter housing.

To make it possible, moreover, to coordinate, without difficulty, the diaphragm mechanism with the diaphragm scale used, the diaphragm setting member of shutters of the above-mentioned design has been provided with an adjusting slide and this has been fastened variably or adjustably to the diaphragm actuator in its relative position in relation to the latter. Provided on the adjusting slide is a scale pointer which interacts with the diaphragm scale arrangement and which, during the diaphragm setting operation, with the aid of a plug gauge or test plug, has to be coordinated or precalibratingly adjusted with the predetermined light or exposure defining quantities or parameters of the shutter used, that is to say of its associated diaphragm and diaphragm scale.

When objectives of the design described above are equipped in a conventional way with a polygonal diaphragm, which is preferably formed by five leaves and which has been preferred over other designs of diaphragm arrangements because of its easy action and low production costs, the linear control curve characteristic of the control cam of the diaphrgm actuator must be selected so that when the actuator is actuated the free passage opening area or light passage area, and which forms in profile a pentagon with edges running in a straight line, corresponding to the geometrical form of the leaves, doubles in cross sectional light passage size from one diaphragm value to the next.

Furthermore, it is necessary to take precautions which, after the maximum size open diaphragm aperture still just lying within the fixed light passage of the objective has been reached, cause an absolute displacement of the diaphragm leaves out of or peripherally outwardly beyond the predetermined light passage of the objective when this condition is desired. As is known per se, this effect can be achieved in a simple way by providing in the end region of the diaphragm actuator cam control curve a steep ascent differing from the angle of ascent in the linear main region of the control curve.

However, the behavior is such that the effect originating from this steep ascent of the control curve can only be expected in the case of using a given objective, the free light passage of which corresponds to that of the central shutter or the associated control curve of the diaphragm mechanism. If objectives with a free light passage, the diameter of which is less than that of the central shutter, are utilized, the steep ascent provided in the end region of the linear control curve can no longer fulfill the function intended for it, specifically because as a result of the smaller diameter of the light passage of the objective, the end region of the control curve can no longer be activated or be functional to serve its intended purpose.

SUMMARY OF THE INVENTION

It is among the objects and advantages of the present invention to eliminate the above described defect in conventional arrangements, and to provide, with relatively simple constructional means, the preconditions for the possibility of adapting the effect originating from the diaphragm control curve of a given central shutter unit to the optical values of even those objectives, the light passage of which is less in size than the passage size of the particular central shutter.

To solve this problem, according to the present invention, there is provided an arrangement in which, in addition to the adjusting slide, there is assigned to the diaphragm actuator of a given central shutter of the type described in detail hereinabove, a separated curved cam piece which is arranged releasably and adjustably and on which is provided a control curve cam edge which corresponds substantially to the steep ascent portion or region of the diaphragm control curve cam and which can be advanced to the linear main region of the diaphragm control curve in accordance with the light passage of the objective which is built into the central shutter.

By means of this simple additional part which can be produced at moderate cost, it becomes possible for the shutter manufacturer to adapt the control curve of the diaphragm actuator to the specific optical values of the objective to be combined with the central shutter for a particular objective/shutter combination or unit. There is no need for the shutter manufacturer therefore to prepare each time a diaphragm actuator with a specific control curve adapted to the optical system used. As a result, advantageously production can be made more efficient and hence more economical because the diaphragm actuator provided with a control curve is made so that it can be used universally for any and all such central shutters with different passage sizes or shutter-/objective combinations.

In an advantageous embodiment or development of the present invention, the curved cam piece is fastened to the diaphragm actuator by means of a releasable screw connection permitting variation of the relative setting position thereof, and as a result it is possible to limit the time required for the setting operation to a minimum and to simplify considerably the adjustability as such of each particular arrangement in question.

BRIEF DESCRIPTION OF THE DRAWINGS

The present invention is described in greater detail with reference to an exemplary embodiment and as illustrated in the accompanying drawing, in which:

FIG. 1 is a schematic side view, which shows, in partial longitudinal section, a between-the-lens shutter or central shutter for professional or studio cameras, with a built-in objective system consisting of a front element and a rear element for one optical lens assembly, FIG. 2 is a schematic rear view of the shutter of FIG. 1 without the objective system and only the light passage $D_{o1}$ of which is indicated in phantom, FIG. 3 is a schematic end view of the shutter, e.g. looking down when the shutter is in the position shown in FIG. 2, and likewise without the objective system.

DETAILED DESCRIPTION OF THE INVENTION

Figure 4:
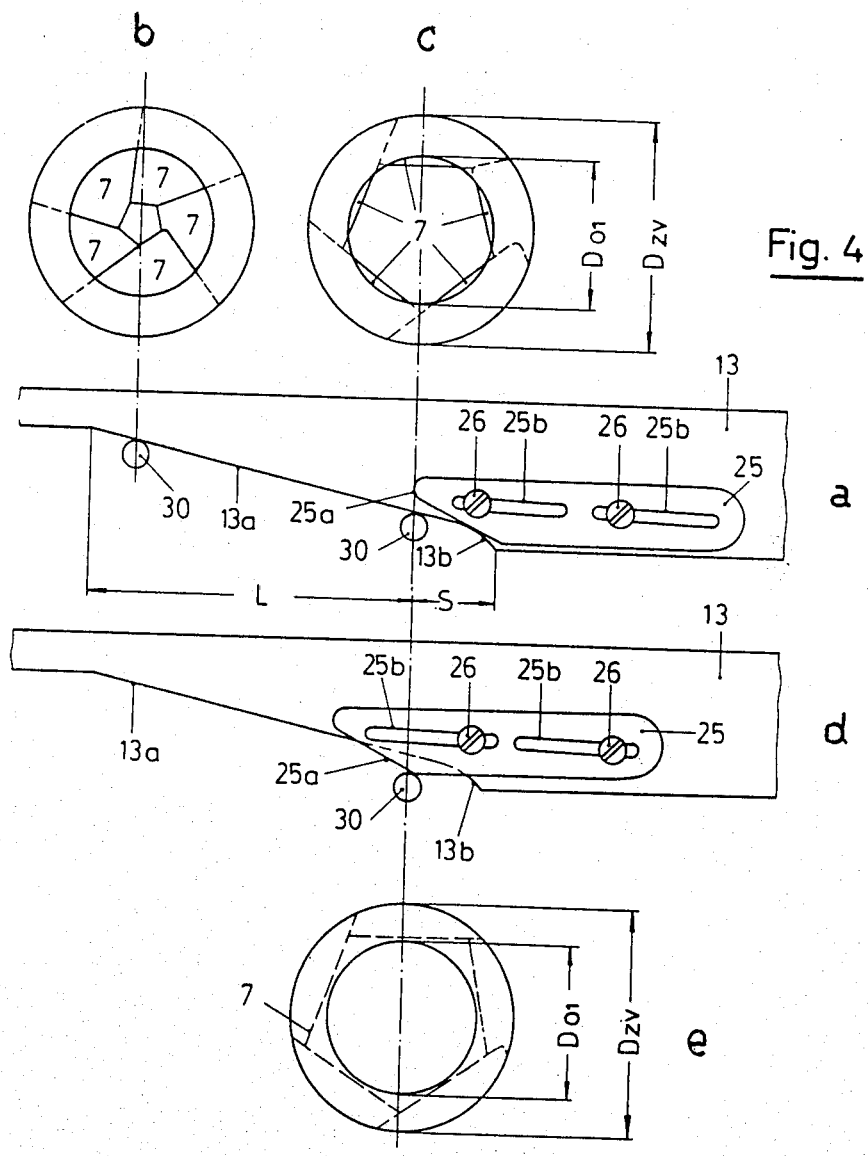
FIG. 4a is a schematic view which shows a portion of the diaphragm actuator of the shutter, but on an enlarged scale as a flat component or flat projection for the sake of better understanding of its function, "L" indicating the linear portion or main region and "S" indicating the steeply ascending portion or end region of the diaphragm control curve cam.
FIG. 4b and FIG. 4c are schematic view of two diagrammatic representations of the respective aperture of the diaphragm, releasing the leaves of the latter in different diameter size open light passage positions of the diaphragm actuator in relation to the mechanism actuating the leaves, i.e. the actuating lever.
FIG. 4d is a schematic view which shows the diaphragm actuator in the same setting position as in FIG. 4a, but with a changed relative position of the curved cam piece which is brought into active position.
FIG. 4e is a schematic view of the associated diaphragm which has, during this setting operation of the diaphragm actuator as shown in FIG. 4d, displaced the diaphragm leaves completely out of the light passage of the objective system.

In the illustration according to FIG. 1, 1 denotes a central shutter known per se, only the top diametric half of which is shown, and which has a shutter free light passage or shutter inside diameter light passage $D_{zv}$ of predetermine size diameter. Built into this shutter is an objective 2 which is a light passage system formed by a front element 2a and a rear element 2b, and the objective free light passage $D_{o1}$ has a substantially smaller size diameter than that of the passage $D_{zv}$ of the shutter. The central shutter 1 and the objective 2 form a constructional unit or composite assembly and are clamped firmly in the usual way such as by means of a threaded ring 4 to an objective plate 5 only indicated schematically in FIG. 1. The latter unit can, in turn, as known per se, be inserted releasably into the highspeed shutter receptacle of the front carrier of a bellows camera or optical bench (not shown) for the usual purposes, as the artisan will appreciate.

In this regard, 6 denotes the shutter sectors, 7 the diaphragm leaves and 8 and 9 the respective lens combinations of the optical lens system inserted into the front and rear elements 2a and 2b respectively of the unit, thereby providing the essentials of the light exposure controllable members and forming a between-the-lens shutter. As also shown in FIG. 1, the lenses are provided on their peripheries with a lacquer coating 8a and 9a respectively which determines or defines the effective diametric size of the light passage $D_{o1}$ of the objective 2 of the resultant central shutter or between-the-lens shutter 1.

Since only the diaphragm mechanism is important for understanding the present invention, there is no need for a more detailed discussion of the shutter mechanism, and hence only the sectors 6, the exposure setter 10 with a scale 11 and the cocking and release lever 12 are illustrated in the drawing.

Figure 5:
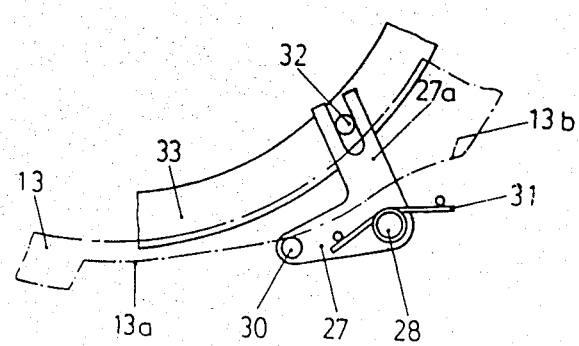
FIG. 5 shows the actuating lever resting tensionally on the diaphragm control curve cam and intended for actuating the diaphragm leaf ring.

As is evident especially from FIG. 2, the diaphragm leaves 7 are adjusted by means of a diaphragm actuator 13 which is mounted, in a way known per se, rotatably on an annular projection 1a arranged concentrically to the shutter light passage or orifice $D_{zv}$ and which is secured axially by slotted screws 14. Provided, as is customary, on the diaphragm actuator 13 and inherently defined thereby is a control curve cam which, according to the clearer illustration in FIG. 5, has a continuously ascending control curve cam portion or main region 13a and at the end a more steeply ascending control curve cam portion or end region 13b.

In the main region 13a of the control curve, the ascent is selected so that during a setting movement of the actuator 13 the mechanism of the diaphragm leaves 7, preferably designed as a polygonal leaf system diaphragm or diaphragm mechanism, correspondingly undergoes a doubling or halving of the opening area from one diaphragm stage or stop to the next, e.g. down to a small size diaphragm opening as shown in FIG. 4b. On the other hand, after the largest aperture formed by the polygonal diaphragm has been exceeded, by means of the steeply ascending end curve or end region 13b, a complete displacement of the diaphragm leaves 7 out of, i.e. peripherally outwardly beyond, the light passage $D_{zv}$ of the central shutter 1 is normally sought to be achieved.

However, this effect expected from the end region 13b of the control curve 13a can occur only when an objective is fitted to the central shutter 1, whose objective free light pasage size corresponds to the shutter free light passage size $D_{zv}$ of the particular central shutter 1. If this is not the case, that is to say, if the largest effective aperture or light passage size of the objective 2 only corresponds, for example, to the diameter $Do_1$, when the diaphragm setting corresponding to the largest diaphragm aperture or light passage size is established, the edges of the diaphragm leaves 7 still do not complete release clear, i.e. more peripherally outwardly beyond, the free aperture or light passage $Do_1$ of the objective 2.

The reason for this is that the shutter aperture size or effective cross sectional area configuration is also formed by a polygon which, although corresponding in area to the largest diaphragm aperture size or effective cross sectional area configuration, nevertheless is not congruent with the slightly larger outward limits of the circular or fully rounded aperture of the objective 2. This differential relationship can be seen in the illustration according to FIG. 4c. Here, while the corners or apexes of the polygon clear, or are already concealed by or disposed peripherally outwardly beyond the perimetric limits of, the circular aperture $Do_1$, its edges which are disposed between such polygon corners do not clear, or still project into, the aperture with corresponds to the free passage of the objective.

As may be seen in FIG. 2, located on the diaphragm actuator 13 is a slide 17 which is provided for limiting the setting range and for adjustment purposes and which has longitudinal slots 17a and is fastened releasably to the actuator and also variably in terms of its relative position in relation to the latter by means of slotted screws 18 which pass through the slots 17a.

Formed on the adjusting slide 17, in addition to a gripping handle 17b serving for manual actuation of the actuator 13, is a pointer 17c which must be brought into a position coinciding with the corresponding value on a diaphragm scale 19 for the purpose of setting the desired diaphragm aperture width. A toothing or tooth portion 17d provided on the adjusting slide 17 and interacting with a fixed catch 20 serves to secure the adjusting slide 17 and consequently the diaphragm actuator 13 in its set position.

For reasons of easy adaptability of the diaphragm scale 19 to the objective 2 to be built into the central shutter 1, the diaphragm values are preferably applied on a separate scale arc which surrounds the shutter housing and can be connected fixably to this housing in the usual manner by fastening means (not shown). Before attachment, the shutter or objective manufacturer must select from an assortment of available scale arcs one having a diaphragm value series which corresponds to the f-number of the objective to be built in and the value series established therefor.

When the selection has been made, the relative setting of the adjusting slide 17 must be carried out and also that of the end stop 21a which is assigned to it and which limits its setting range in one direction of movement. For this purpose, the stop 21a is provided in the form of a screw element which is to be inserted selectively into one of a plurality of incrementally positioned and aligned threaded bores 22 fashioned in the rearward part of the shutter housing 1 and thus which is connected to the particular selected threaded bore 22 by screwing.

A further end stop 21b of the same screw element type is provided for limiting the setting range of the adjusting slide 17 in the other or opposite direction of movement and for this purpose is screwed to the rear side of the shutter housing fixably in a given threaded bore and without any possibility of a change of position, since adjustment of the range of movement of the diaphragm adjustor setting slide 17 need only be accomplished by selecting the end position of the other end stop 21a in a given bore 22.

According to the illustration in FIGS. 2, 4a and 4d, assigned to the diaphragm actuator 13, in addition to the adjusting slide 17, is a separate curved cam piece 25 on which is formed a control curve cam edge 25a which can assume the function of the steep ascent cam portion or end region 13b of the control curve cam of the diaphragm actuator 13. Slots 25b fashioned in the curved cam piece 25 serve, by interacting with fastening screws 26, as means for relative adjustment of curved cam piece 25 in relation to the diaphragm actuator 13.

Thus, after the fastening screws 26 have been slackened or loosened, the slots 25b allow the control curve cam edge 25a of the cam piece 25 to advance into the effective range of the control-curve cam portion 13a of the control curve cam of the diaphragm actuator 13.

In this regard, 27 denotes a two-armed lever which is mounted spatially fixed but rotatably on a journal 28 and which rests at one end by means of a cam follower lever pin 30 carried on that end against the control-curve cam portion 13a and 13b respectively under the tensioning effect of a coil spring 31 and which by means of its other or fork-shaped end 27a engaging around a pin 32 is brought into drive connection with the setting ring 33 of the diaphragm leaves 7 which carries such pin 32.

In operation, when it is intended to transfer to the control curve cam edge 25a of the curved cam piece 25, the function of the steep ascent cam portion 13b of the control curve cam of the diaphragm actuator 13 for adaptation to the smaller light passage $Do_1$ of an objective 2 built into the shutter, then, as is evident from FIG. 4a, displacement of the curved cam piece 25 must be carried out when adjusting the diaphragm actuator 13 to the diaphragm value (for example, 5.6) corresponding to the largest aperture of the objective. The initial state is shown in FIGS. 4a and 4c. Here, the cam follower lever pin 30 on the two-armed lever 27 still rests on the continuously ascending control curve or linear cam portion 13a of the control curve cam defined by the diaphragm actuator 13.

After the fastening screws 26 have been slackened, the curved cam piece 25 is first moved towards the pin 30 of the two armed setting lever 27 until its control curve cam edge 25a touches the pin. When the curved cam piece 25 moves further in the same direction, the control curve cam edge 25a is activated and, via the cam follower lever pin 30 resting against it, as shown in FIG. 4d, displaces the setting lever fork shaped end 27a against the tension of the coil spring 31 and about the journal 28 from its previous set position and this itself moves the diaphragm leaves 7 farther, i.e. via the pin 32 on the diaphragm leaf setting ring 33, so that, as shown in FIG. 4e as compared to FIG. 4c, they move back completely behind or peripherally outwardly beyond the circular light passage $D_{O1}$ of the objective 2.

After this one time calibrating or setting operation, the fastening screws 26 are tightened again, so that the curved cam piece 25 is retained securely in the set position given to it previously.

Thus, the present invention broadly contemplates a shutter for a camera, such as a professional camera, which comprises a shutter having a predetermined diameter size shutter light passage, a lens system objective having a specific f-number and a particlar diameter size objective light passage, a polygonal diaphragm having a plurality of coacting diaphragm leaves arranged for forming a diaphragm aperture and for movement to change the diaphragm aperture size, and a diaphragm actuator arranged with a setting range adapted to the specific f-number of the objective, and having a control curve cam provided with a curved cam portion, including a linear characteristic main cam region arranged for controlling the movement of the diaphragm leaves to change the diaphragm aperture size, and a steeply ascending end cam region arranged for controlling the movement of the diaphragm leaves to move the leaves completely out of the shutter light passage, in combination with a separate modifying curved piece.

The separate modifying curved piece is advantageously releasably and adjustably located on the diaphragm actuator and has a control curved edge which corresponds substantially to the steeply ascending end cam region of the curved cam portion and which is arranged for advancement relative to the control cam operatively from the vicinity of such end cam region, i.e. from an inoperative position, to the vicinity of the curved cam portion linear characteristic main cam region, i.e. to an operative position in the normal path of movement of the main cam region and selectively overlapping with the adjacent end portion thereof for effecting a shortening of the main cam region and an earlier transition to the concordant steeply ascending end cam region defined by the control curved edge of the modifying curved piece than otherwise provided by the steeply ascending end cam region of curved cam portion of the control curve cam itself.

Accordingly, such advancement of the control curved edge of the separate modifying curved piece may be used for changing the relative setting position thereof, i.e. relative to the diaphragm actuator and its setting range, for modifying the controlling of the movement of the diaphragm leaves in accordance with the diameter size of the particular objective light passage to assure that the diaphragm leaves move completely out of the shutter light passage, e.g. where the lens system objective comprises a built in objective which is built into the shutter, and more particularly where the objective light passage is of smaller diameter size than that of the shutter light passage, especially in the case of a central shutter or between-the-lens shutter arrangement.

Generally, an adjusting slide is advantageously also provided which is releasably and adjustably located on the diaphragm actuator and controllably arranged for limiting the setting range of the diaphram and provided with a scale for so adapting the diaphragm actuator to the specific f-number of the objective.

It will be appreciated that the foregoing specification and accompanying drawings are set forth by way of illustration and not limitation, and that various modifications and changes may be made therein without departing from the spirit and scope of the present invention which is to be limited solely by the scope of the appended claims.

What is claimed is:

1. Central shutter for a camera, such as a professional camera, which comprises
   a shutter having a predetermined diameter size shutter light passage,
   a built in lens system objective including a front element and a rear element, and having a specific f-number and a particular diameter size objective light passage,
   a polygonal diaphragm having a plurality of coacting diaphragm leaves arranged for forming a diaphragm apreture and for movement to change the diaphragm aperture size,
   a diaphragm setting mechanism comprising a diaphragm actuator having a control curve cam provided with a curved cam portion, including a linear characteristic main cam region arranged for controlling the movement of the diaphragm leaves to change the diaphragm aperture size, and a steeply ascending end cam region arranged for controlling the movement of the diaphragm leaves to move the leaves completely out of the shutter light passage, and further comprising an adjusting slide releasably and adjustably located on the diaphragm actuator and controllably arranged for limiting the setting range of the diaphragm and provided with a gripping handle and a scale indicator for adapting the diaphragm actuator to the specific f-number of the objective,
   in combination with a separate modifying curved piece releasably and adjustably located on the diaphragm actuator and having a control curved edge which corresponds to the steeply ascending end cam region of the curved cam portion and which is arranged for advancement relative to the control curve cam operatively from the vicinity of such end cam region to the vicinity of the curved cam portion linear characteristic main cam region for modifying the controlling of the movement of the diaphragm leaves in accordance with the diameter size of the particular objective light passage to assure that the diaphragm leaves move completely out of the shutter light passage.

2. Shutter of claim 1 wherein the modifying curved piece is fastened to the diaphragm actuator by releasable screw and slot connection means for permitting selective variation of the relative setting position thereof.

3. Shutter of claim 1 wherein the diaphragm has five leaves.

4. Central shutter for a camera, such as a professional camera, which comprises
   a shutter having a predetermined diameter size shutter light passage,
   a lens system objective having a specific f-number and a particular diameter size objective light passage,
   a polygonal diaphragm having a plurality of coacting diaphragm leaves arranged for forming a diaphragm aperture and for movement to change the diaphragm aperture size,
   a diaphragm actuator having a control curve cam provided with a curved cam portion, including a linear characteristic main cam region arranged for controlling the movement of the diaphragm leaves to change the diaphragm aperture size, and a steeply ascending end cam region arranged for controlling the movement of the diaphragm leaves to move the leaves completely out of the shutter light passage, and an adjusting slide releasably and adjustably located on the diaphragm actuator and controllably arranged for limiting the setting range of the diaphragm and provided with a scale indicator for adapting the diaphragm actuator to the specific f-number of the objective, in combination with a separate modifying curved piece releasably and adjustably located on the diaphragm actuator and having a control curved edge which corresponds substantially to the steeply ascending end cam region of the curved cam portion and which is arranged for advancement relative to the control curve cam operatively from the vicinity of such end cam region to the vicinity of the curved cam portion linear characteristic main cam region for modifying the controlling of the movement of the diaphragm leaves in accordance with the diameter size of the particular objective light passage to assure that the diaphragm leaves move completely out of the shutter light passage.

5. Shutter of claim 4 wherein the modifying curved piece is fastened to the diaphragm actuator by releaseable screw and slot connection means for permitting selective variation of the relative setting position thereof.

6. Shutter of claim 4 wherein the diaphragm has at least five leaves.

7. Shutter of claim 4 wherein the diaphragm actuator and adjusting slide comprise a diaphragm setting mechanism provided with a gripping handle.

8. Shutter of claim 4 wherein the lens system objective comprises a built in objective which is built into the shutter.

9. Shutter for a camera, such as a professional camera, which comprises a shutter having a predetermined diameter size shutter light passage, a lens system objective having a specific f-number and a particular diameter size objective light passage, a polygonal diaphragm having a plurality of coacting diaphragm leaves arranged for forming a diaphragm aperture and for movement to change the diaphragm aperture size, and a diaphragm actuator arranged with a setting range adapted to the specific f-number of the objective, and having a control curve cam provided with a curved cam portion, including a linear characteristic main cam region arranged for controlling the movement of the diaphragm leaves to change the diaphragm aperture size, and a steeply ascending end cam region arranged for controlling the movement of the diaphragm leaves to move the leaves completely out of the shutter light passage, in combination with a separate modifying curved piece releasably and adjustably located on the diaphragm actuator and having a control curved edge which corresponds substantially to the steeply ascending end cam region of the curved cam portion and which is arranged for advancement relative to the control cam operatively from the vicinity of such end cam region to the vicinity of the curved cam portion linear characteristic main cam region for changing the relative setting position thereof for modifying the controlling of the movement of the diaphragm leaves in accordance with the diameter size of the particular objective light passage to assure that the diaphragm leaves move completely out of the shutter light passage.

10. Shutter of claim 9 wherein the lens system objective comprises a built in objective which is built into the shutter.

11. Shutter of claim 10 wherein the objective light passage is of smaller diameter size than that of the shutter light passage.

12. Shutter of claim 11 wherein the shutter is a central shutter.

* * * * *